United States Patent
Kurz et al.

(10) Patent No.: US 10,062,169 B2
(45) Date of Patent: *Aug. 28, 2018

(54) METHOD OF PROVIDING A DESCRIPTOR FOR AT LEAST ONE FEATURE OF AN IMAGE AND METHOD OF MATCHING FEATURES

(71) Applicant: Apple Inc., Cupertino, CA (US)

(72) Inventors: Daniel Kurz, Munich (DE); Selim Benhimane, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/567,668

(22) Filed: Dec. 11, 2014

(65) Prior Publication Data

US 2015/0092987 A1    Apr. 2, 2015

Related U.S. Application Data

(63) Continuation of application No. 13/502,952, filed as application No. PCT/EP2010/057461 on May 28, 2010, now Pat. No. 8,942,418.

(30) Foreign Application Priority Data

Oct. 19, 2009   (DE) .................. 10 2009 049 849

(51) Int. Cl.
*G06K 9/00* (2006.01)
*G06T 7/00* (2017.01)
(Continued)

(52) U.S. Cl.
CPC ........ *G06T 7/0042* (2013.01); *G06K 9/00624* (2013.01); *G06K 9/3216* (2013.01);
(Continued)

(58) Field of Classification Search
None
See application file for complete search history.

(56) References Cited

U.S. PATENT DOCUMENTS 4,700,307 A   10/1987   Mons et al.
7,023,536 B2   4/2006   Zhang et al.
(Continued)

FOREIGN PATENT DOCUMENTS

CN   101004748   7/2007
CN   101109818   1/2008
(Continued)

OTHER PUBLICATIONS

Satoh et al. "A Hybrid Registration Method for Outdoor Wearable Mixed Reality", vol. 7, No. 2, pp. 129-138, 2002.
(Continued)

*Primary Examiner* — Nirav G Patel
(74) *Attorney, Agent, or Firm* — Blank Rome LLP

(57) ABSTRACT

A method of providing a descriptor for at least one feature of an image comprises the steps of providing an image captured by a capturing device and extracting at least one feature from the image, and assigning a descriptor to the at least one feature, the descriptor depending on at least one parameter which is indicative of an orientation, wherein the at least one parameter is determined from the orientation of the capturing device measured by a tracking system. The invention also relates to a method of matching features of two or more images.

20 Claims, 5 Drawing Sheets

Embodiment of the invention

(51) Int. Cl.
*G06K 9/32* (2006.01)
*G06K 9/46* (2006.01)
*G06K 9/62* (2006.01)
*G06T 7/30* (2017.01)
*G06T 7/33* (2017.01)
*G06T 7/70* (2017.01)
*G06T 7/73* (2017.01)
*G06T 7/246* (2017.01)

(52) U.S. Cl.
CPC .............. *G06K 9/46* (2013.01); *G06K 9/6202* (2013.01); *G06T 7/246* (2017.01); *G06T 7/30* (2017.01); *G06T 7/33* (2017.01); *G06T 7/70* (2017.01); *G06T 7/73* (2017.01); *G06T 2207/10012* (2013.01); *G06T 2207/30232* (2013.01); *G06T 2207/30244* (2013.01)

(56) References Cited

U.S. PATENT DOCUMENTS

| | | |
|---|---|---|
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,474,809 B2 | 1/2009 | Carl et al. |
| 7,729,515 B2 | 6/2010 | Mandella et al. |
| 7,768,534 B2 | 8/2010 | Pentenrieder |
| 7,826,641 B2 | 11/2010 | Mandella et al. |
| 7,889,193 B2 | 2/2011 | Platonor et al. |
| 7,961,909 B2 | 6/2011 | Mandella et al. |
| 8,005,261 B2 | 8/2011 | Baur et al. |
| 2003/0025714 A1 | 2/2003 | Ebersole et al. |
| 2004/0090444 A1 | 5/2004 | Satoh |
| 2005/0168437 A1 | 8/2005 | Carl et al. |
| 2005/0231419 A1 | 10/2005 | Mitchell |
| 2006/0227211 A1 | 10/2006 | Kotake et al. |
| 2007/0110338 A1 | 5/2007 | Snavely et al. |
| 2008/0109184 A1 | 5/2008 | Aratani et al. |
| 2008/0284864 A1 | 11/2008 | Kotake et al. |
| 2009/0041340 A1 | 2/2009 | Suzuki et al. |
| 2009/0185746 A1 | 7/2009 | Mian et al. |
| 2009/0190798 A1 | 7/2009 | Lee et al. |
| 2009/0324026 A1 | 12/2009 | Kletter |
| 2010/0208941 A1 | 8/2010 | Broaddus et al. |
| 2010/0259546 A1 | 10/2010 | Yomdin et al. |
| 2010/0329513 A1 | 12/2010 | Klefenz |
| 2011/0227915 A1 | 9/2011 | Mandella et al. |
| 2012/0038549 A1 | 2/2012 | Mandella et al. |
| 2012/0195471 A1 | 8/2012 | Newcombe et al. |
| 2013/0194418 A1 | 8/2013 | Gonzalez-Banos et al. |
| 2013/0195362 A1 | 8/2013 | Janky et al. |

FOREIGN PATENT DOCUMENTS

| | | |
|---|---|---|
| CN | 101285686 | 10/2008 |
| DE | 10145608 B4 | 1/2006 |
| DE | 102005064952 A1 | 6/2007 |
| DE | 102006055893 A1 | 5/2008 |
| DE | 202006020299 | 5/2008 |
| EP | 1544795 | 6/2005 |
| JP | 06-274788 | 9/1994 |
| JP | 2003-344018 | 12/2003 |
| JP | 2005-326275 | 11/2005 |
| JP | 2009-070314 | 4/2009 |

OTHER PUBLICATIONS

Zhiying Zhou et al. "Robust Pose Estimation for Outdoor Mixed Reality with Sensor Fusion", Jul. 19, 2009, Universal Access in Human-Computer Interaction, Applications and Services, pp. 281-289.
Wixon L. et al. "Improved illumination assessment for vision-based traffic monitoring", Visual Surveillance, Jan. 1, 1997, pp. 34-41.
Mark R. Stevens et al. "Precise Matching of 3-D Target Models to Multisensor Data", IEEE Transactions Image Processing, vol. 6, No. 1, Jan. 1, 1997.
Battle J. et al. "A review on strategies for recognizing natural objects in colour image of outdoor scenes", Image and Vision Computing, Jan. 1, 2000, pp. 515-530.
Cathala T. et al. "Real time simulation tools in the CHORALE workshop", Proceedings of the SPIE, Jan. 1, 2006.
Narasimhan S.G. et al. "All the images of an outdoor scene", Lecture Notes in Computer Science, Jan. 1, 2002.
Bernhard Reitinger et al. "Augmented Reality Scouting for Interactive 3D Reconstruction", Virtual Reality Conference, 2007, Mar. 1, 2007.
Akbarzadeh A. et al. "Towards Urban 3D Reconstruction from Video", 3D Data Processing, Visualization, and Transmission, Jun. 1, 2006, pp. 1-8.
"From video image e.g. (Automatic Fog Detection and Estimation of Visibility Distance through use of an Onboard Camera)", Zeitschrift Machine Vision and Applications Verlag Springer Berlin / Heidelberg ISSN 0932-8092 (Print) 1432-1769 (Online) Heft, vol. 17, No. 1 / Apr. 2006, Seiten 8-20.
Satoh et al. "A Hybrid Registration Method for Outdoor Augmented Reality", Augmented Reality, Oct. 2001. pp. 67-76.
Mikolajczyk et al. "A Performance Evaluation of Local Descriptors", IEEE Transactions on Pattern Analysis and Machine Intelligence, vol. 27, No. 10, Oct. 1, 2005, pp. 1615-1630.
Lowe "Distinctive Image Features from Scale-Invariant Keypoints", International Journal of Computer Vision, vol. 60, No. 2, 2004, pp. 91-110.
Brown, et al., "Invariant Features from Interest Point Groups", BMVC. No. s. 1. 2002.
Tola et al., "A fast local descriptor for dense matching", Computer Vision and Pattern Recognition, 2008. CVPR 2008. IEEE Conference on IEEE 2008.
Feiner et al. "A Touring Machine: Prototyping 3d Mobile Augmented Reality Systems for Exploring the Urban Environment", Proceedings of the 1st International Symposium on Wearable Computers, pp. 74-81, 1997.
Henrich et al. "AR Weather", Mixed and Augmented Reality, 2008, pp. 187-188.
Hautiere et al. "Automatic Fog Detection and Estimation of Visibility Distance Through Use of an Onboard Camera", Machine Vision and Applications, vol. 17, No. 1, Apr. 2006, pp. 8-20.
CN Office Action dated Oct. 23, 2014.
JP office action dated May 26, 2015.
Fujii et al. "A Registration Method for Using Stereo Cameras with an Inertial Sensor for Augmented Reality", Technical Report of IEICE, Jan. 2000.
Myung Hwangbo et al., "Inertial-aided KLT feature tracking for a moving camera," Intelligent Robots and Systems, 2009, IROS 2009, IEEE/RSJ International Conference on, IEEE, Piscataway, NJ, USA, Oct. 10, 2009, pp. 1909-1916, XP031580454, ISBN: 978-1-4244-3803-7.

Exemplary scene

Fig. 3 Standard approach

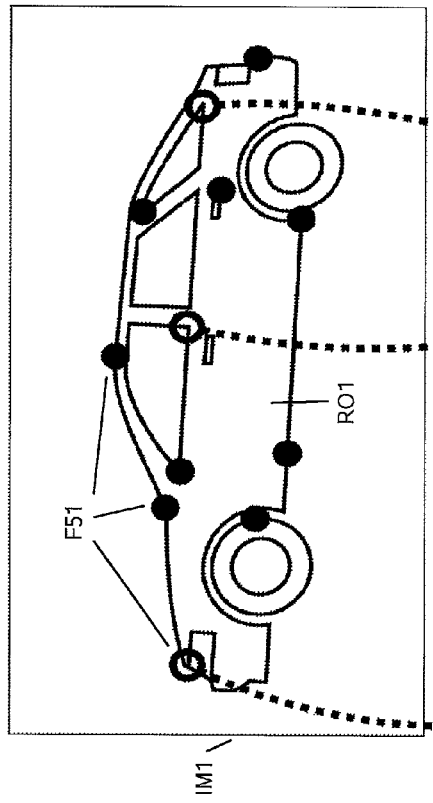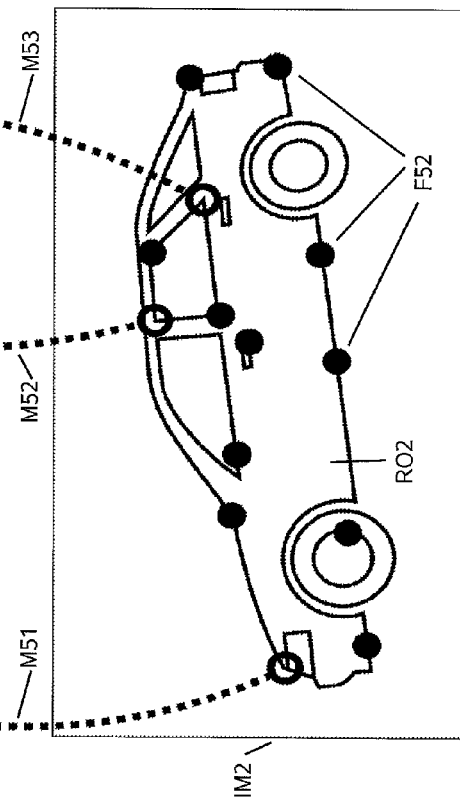
Fig. 5
Matching process
Fig. 5A
Fig. 5B

METHOD OF PROVIDING A DESCRIPTOR FOR AT LEAST ONE FEATURE OF AN IMAGE AND METHOD OF MATCHING FEATURES

This application is a continuation of U.S. patent application Ser. No. 13/502,952 filed May 14, 2012, which is a national stage application of PCT Application No. PCT/EP2010/057461 filed on May 28, 2010, which claims priority to German Application No. 10 2009 049 849.4 filed Oct. 19, 2009.

BACKGROUND OF THE INVENTION

1. Technical Field

The present invention relates to a method of providing a descriptor for at least one feature of an image and to a method of matching features of two or more images. Moreover, the invention relates to a computer program product comprising software code sections for implementing the method according to the invention.

2. Background Information

Many applications in the field of computer vision require finding corresponding points or other features in two or more images of the same scene or object under varying viewpoints, possibly with changes in illumination and capturing hardware used. The features can be points, or a set of points (lines, segments, regions in the image or simply a group of pixels). Example applications include narrow and wide-baseline stereo matching, camera pose estimation, image retrieval, object recognition, and visual search.

For example, Augmented Reality Systems permit the superposition of computer-generated virtual information with visual impressions of a real environment. To this end, the visual impressions of the real world, for example captured by a camera in one or more images, are mixed with virtual information, e.g., by means of a display device which displays the respective image augmented with the virtual information to a user. Spatial registration of virtual information and the real world requires the computation of the camera pose (position and orientation) that is usually based on feature correspondences.

A common way, e.g. such as described in David G. Lowe: "Distinctive Image Features from Scale-Invariant Keypoints", International Journal of Computer Vision, 60, 2 (2004), pp. 91-110, to gain such correspondences is to first extract features or interest points (e.g. at edges, corners or local extrema) from the individual images that have a high repeatability. That is, the probability that the same sets of pixels corresponding to the same physical entities are extracted in different images is high. The second step is then to create a descriptor for each feature, based on the intensities of its neighborhood pixels, that enables the comparison and therefore matching of features. The two main requirements for a good descriptor are distinctiveness, i.e. different feature points result in different descriptors, and invariance to 1) changes in viewing direction, rotation and scale,
2) changes in illumination,
3) image noise.

This is to ensure that the same feature in different images will be described in a similar way with respect to a similarity measure. To address the invariance against rotation, a spatial normalization transforms the pixels of the local neighborhood around a feature point to a normalized coordinate system prior to the construction of the descriptor.

It is critical to the invariance that this normalization is reproducible. More advanced methods exist, but in the simplest case the normalization only consists of an in-plane rotation according to the feature orientation. The orientation is usually defined based on the pixel intensities in the neighborhood of a feature point, e.g. as the direction of the largest gradient. Ideally the pixels in the normalized neighborhood of a feature are identical for different images taken with varying viewing direction, rotation and scale. In practice, they are at least very similar, cf. FIG. 2.

In FIG. 2, there is shown an exemplary feature point in different scenes 21 and 22. In the first column showing the scenes 21 and 22, the same feature point under two different orientations is shown as feature point F21 in scene 21 and feature point F22 in scene 22. In a next step the orientation is defined based on the pixel intensities in the neighborhood of the respective feature point F21 and F22, in the present example as the direction of the largest gradient (depicted by the white line within the respective rectangle). Then, a spatial normalization transforms the pixels of the local neighborhood around feature points F21 and F22 (in the present case, the pixels within the rectangle) to a normalized coordinate system (depictions 31 and 32 in the second column) prior to the construction of the descriptors d1 and d2 (third column), respectively. As a result, alignment of the descriptors d1, d2 to the largest gradient results in a very similar normalized neighborhood (as shown in depictions 31 and 32) and, therefore, similar descriptors d1 and d2. This property is common among local feature descriptors and referred to as invariance to rotation. Invariance to scale is usually handled by constructing an image pyramid containing the image at different scales and performing the above on every scale level. Other approaches store the scale with every feature descriptor.

A variety of local feature descriptors exist, wherein a good overview and comparison is given in Krystian Mikolajczyk and Cordelia Schmid, "A performance evaluation of local descriptors", IEEE Transactions on Pattern Analysis & Machine Intelligence, 10, 27 (2005), pp. 1615-1630. Most of them are based on the creation of histograms of either intensity values of the normalized local neighborhood pixels or of functions of them, such as gradients. The final descriptor is expressed as an n-dimensional vector (as shown in FIG. 2 on the right) and can be compared to other descriptors using a similarity measure such as the Euclidian distance.

In FIG. 3, there is shown a standard approach for creating a feature descriptor. In step SI, an image is captured by a capturing device, e.g. a camera, or loaded from a storage medium. In step S2, feature points are extracted from the image and stored in a 2-dimensional description (parameters u, v). In step S3, an orientation assignment is performed as described above with respect to FIG. 2, to add to the parameters u, v an orientation angle a. Thereafter, a neighborhood normalization step S4 is performed, as described above with respect to FIG. 2 to gain normalized neighborhood pixel intensities i[ ]. In the final step S5, a feature descriptor in the form of a descriptor vector d[ ] is created for the respective extracted feature as a function of the normalized neighborhood pixel intensities i[ ]. Approaches exist that may assign multiple orientation angles to a feature in step S3 and consequently carry out the steps S4 and S5 for each orientation resulting in one descriptor per assigned orientation.

A major limitation of the standard approaches as described above is that while invariance to rotation is clearly an important characteristic of local feature descriptors in many applications, it may however lead to mismatches when images contain multiple congruent or near-congruent features, as for instance the four corners of a symmetric window or individual dartboard sections.

In an example, as shown in FIG. 1, a real object 3 which is in the present example a building having a window 4, is captured by a mobile device 1 having a camera on the rear side (not shown). For instance, the mobile device 1 may be a mobile phone having a camera and an optical lens on the rear side for capturing an image of the window 4. On the display 6 of the mobile device 1, the window 4 is depicted as shown. An image processing method extracts features from the displayed image, for example the features F1 to F4 representing the four corners of the window that can be considered as prominent features of the window, and creates a feature descriptor for each of the features F1 to F4. Due to invariance to rotation, as schematically illustrated in FIG. 1 in the left column, an ideal local feature descriptor would describe these features F1 to F4 in exactly the same way making them indistinguishable, as illustrated by the extracted features F1 to F4 depicted in a normalized coordinate system in the left column.

In a real word setting with camera noise and aliasing, the descriptors will not be identical but very similar and therefore virtually indistinguishable. Consequently, the probability of mismatches is very high for such scenes which may result in a complete failure of any system relying upon such local feature descriptors.

A variety of approaches exist that assume all camera images to be taken in an upright orientation and therefore do not need to deal with the orientation. Here congruent or near-congruent features in different orientations can easily be distinguished from each other, but the field of possible applications is very limited since the camera orientation is heavily constraint.

Therefore, it would be beneficial to have a method of providing a descriptor for at least one feature of an image, wherein the descriptor is provided in a way that the probability of mismatches due to congruent or near-congruent features in different orientations on a static object or scene in a feature matching process may be reduced without constraining the orientation or movement of the capturing device or without needing prior knowledge on the orientation or movement of the capturing device.

SUMMARY OF THE INVENTION

In a first aspect, there is provided a method of providing a descriptor for at least one feature of an image according to the features of claim 1. Further, in another aspect, there is provided a method of matching features of two or more images according to claim 12. The invention is also concerned with a computer program product comprising software code sections for implementing such methods according to claim 16.

Particularly, in a first aspect, there is provided a method of providing a descriptor for at least one feature of an image, comprising the steps of providing an image captured by a capturing device and extracting at least one feature from the image, and assigning a descriptor to the at least one feature, the descriptor depending on at least one parameter which is indicative of an orientation, wherein the at least one parameter is determined from an absolute or relative orientation of the capturing device measured by a tracking system. Particularly, the tracking system in the context of this invention determines at least one orientation of an object, in particular of the capturing device, preferably with regard to a common coordinate system, as further described in the embodiments below. With the orientation being measured by a tracking system, it is not necessary to constraint the orientation and/or movement of the capturing device to a certain position or to have any prior knowledge on the orientation and/or movement of the capturing device.

In an aspect of the invention, it is proposed to align the orientation of feature descriptors (particularly local feature descriptors) with a certain given common coordinate system. Instead of gaining a reproducible orientation from the intensities of neighboring pixels in the image, additional information on the orientation of individual pixels and/or orientation of the capturing device builds the basis for orientation assignment to a feature. Aligning local feature descriptors to a global orientation overcomes ambiguities resulting from congruent or near-congruent features with different orientations as they are widespread in urban scenes and on man-made objects, as illustrated in FIG. 1 on the right and described in more detail below. In an embodiment of the invention, the tracking system comprises a sensor attached to the capturing device such as an inertial sensor, an accelerometer, a gyroscope, or a compass.

In another embodiment, the tracking system comprises a mechanical tracking system based on a physical connection between the capturing device and a fixed reference point, an electromagnetic tracking system where magnetic fields are generated and measured, an acoustic tracking system working with acoustic waves, and/or an optical tracking system using light emitted and/or reflected from the capturing device. Said optical tracking system can be either integrated into the capturing device or be realized as an external system separately from the capturing device.

In one embodiment of the invention, the common coordinate system is a world coordinate system as measured with a tracking system delivering absolute values (e.g. compass and/or inertial sensors attached to the device).

In another embodiment, the common coordinate system comprises any coordinate system relative to which a tracking system delivers transformations. Relative changes in orientation, for instance measured with a gyroscope, can be accumulated to compute the absolute orientation in common coordinates at every instant without having any sensor that measures the absolute orientation.

In another embodiment, the capturing device comprises a range data capturing device, particularly a laser scanner, time-of-flight camera, or a stereo camera, which provides image pixels with an associated depth and/or 3D position.

In another aspect of the invention, the method further comprises the step of normalizing the neighborhood of the at least one feature with respect to the orientation in a common coordinate system. Particularly, in the step of normalizing the neighborhood of the at least one feature the orientation provides an angle for rotating the image. Optionally, in the step of normalizing the neighborhood of the at least one feature the orientation is used to warp the neighborhood pixels or the entire image to one or more reference orientations to correct for perspective distortions in particular feature neighborhoods.

In another aspect of the invention, a method of matching features of two or more images comprises the steps of extracting at least one first feature of a first image and at least one second feature of a second image, providing a first descriptor for the first feature and a second descriptor for the second feature, wherein at least one of the first and second descriptors is provided according to aspects of the method as described above, and comparing the first and second descriptors in a matching process for the first and second features. In the matching process it may then be determined based on a similarity measure whether the first and second features correspond with each other.

According to an embodiment of the invention, one or more directions of the at least one feature are computed based on pixel intensities of neighboring pixels and stored with respect to the common coordinate system. In the matching stage only features with similar directions with respect to the common coordinate system are matched to reduce the number of comparisons needed and decrease the ratio of false matches.

According to embodiments of the invention, the method may be implemented in a process of stereo matching, particularly wide-baseline stereo matching, camera tracking, image retrieval, object recognition, visual search, pose estimation, visual surveillance, scene reconstruction, motion estimation, panorama stitching or image restoration.

In a further aspect of the invention, there is provided a computer program product adapted to be loaded into the internal memory of a digital computer system coupled with at least one capturing device for capturing an image, and comprising software code sections by means of which the steps according to any of the methods and embodiments as described herein are performed when said product is running on said computer system.

Further embodiments and aspects of the invention will be apparent from the dependent claims.

BRIEF DESCRIPTION OF THE DRAWINGS

The invention will now be explained in more detail with reference to the following figures in which aspects of the invention are depicted according to various exemplary embodiments.

FIG. 5 shows in a schematic manner an exemplary first image and second image depicting the same static object from different viewpoints with respective extracted features which are to be matched.

DETAILED DESCRIPTION OF THE INVENTION

Figure 1:
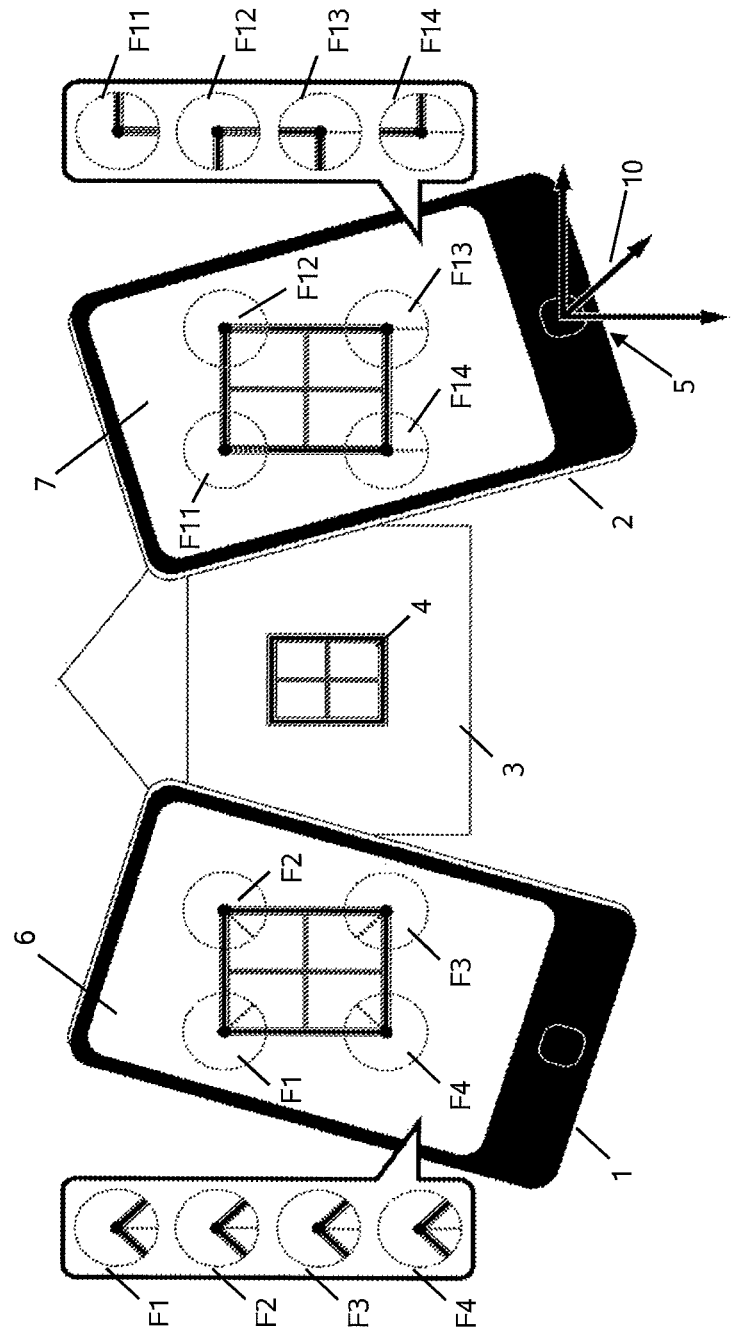
FIG. 1 shows an exemplary scene in which an image is captured by a mobile device having a camera on the rear side thereof, and in which features are extracted from the image and schematically shown in a normalized depiction according to a standard approach (left) and according to an embodiment of the invention (right)
Figure 2:
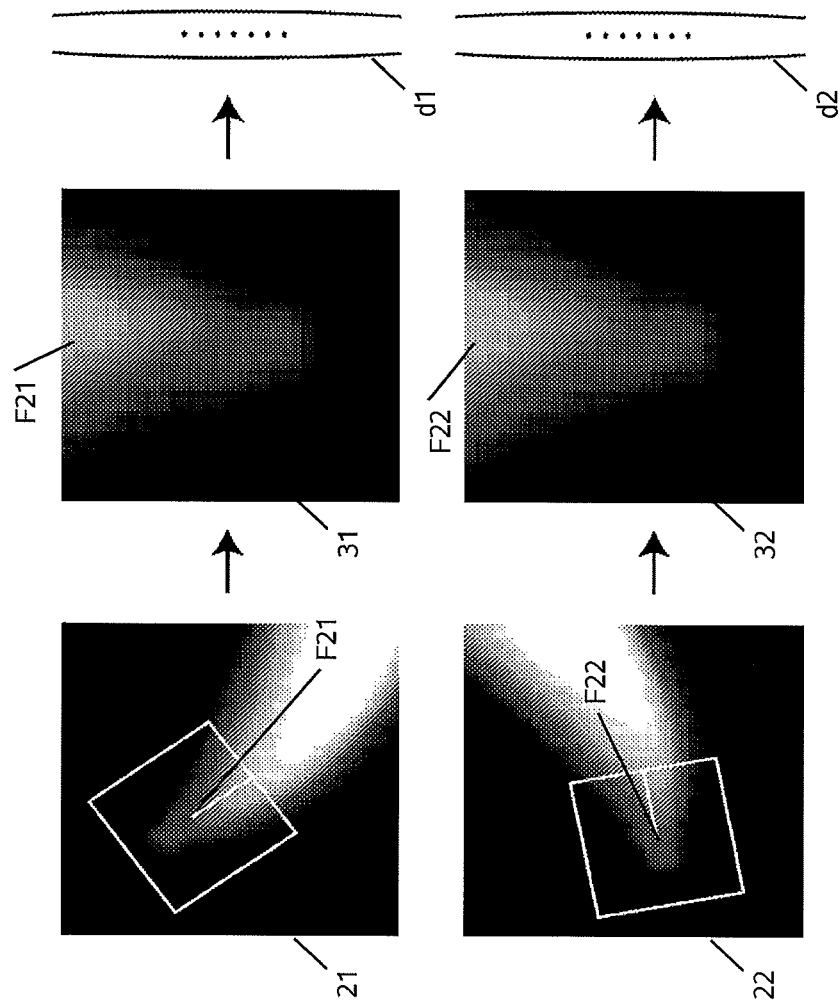
FIG. 2 shows a standard approach to invariance to rotation in an exemplary depiction of a feature point under two different orientations, a normalization of local neighboring pixels of the feature points and the construction of a respective descriptor.
Figure 3:
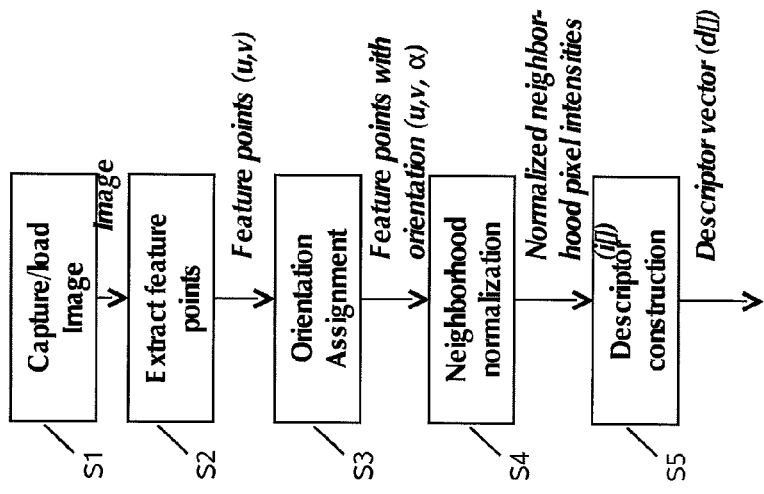
FIG. 3 shows in a flow diagram a standard approach for constructing a feature descriptor.

FIG. 1 shows an exemplary scene in which an image is captured by a mobile device having a camera on the rear side thereof, and in which features are extracted from the image and schematically shown in a normalized depiction according to a standard approach (shown on the left and as described above) and according to an embodiment of the invention (shown on the right).

According to the shown embodiment of the invention, again the real object 3, which is in the present example a building having a window 4, is captured by a mobile device 2 having a camera on the rear side (not shown). For instance, the mobile device 2 may be a mobile phone or digital camera having a microprocessor for image processing and a camera with an optical lens on the rear side for capturing an image of the window 4. However, any other type of device may be used. Likewise, any other type of system configuration with a processing device containing a microprocessor for image processing and a camera may be used either in integrated or distributed form.

The mobile device comprises a sensor 5, for example an inertial sensor, an accelerometer, a gyrometer and/or a compass. As such, the sensor is associated with the camera of the mobile device as the camera is also part of the mobile device. The sensor is appropriate for measuring an orientation of the mobile device 2 with reference to a common coordinate system 10. This can be measured either in an absolute manner or by accumulating relative orientation data over time. Commonly available mobile phones and digital cameras are often equipped with built-in digital accelerometers and compasses that provide a measured value indicative of the current orientation of the device. This information, along with in-formation about the intrinsic parameters of the camera enable the transformation of any orientation in world coordinates, e.g. of the gravitational force or the north, in the coordinate system of the camera image.

On the display 7 of the mobile device 2, the window 4 as captured by the camera of the mobile device 2 is depicted as shown. An image processing method performed in a microprocessor of the mobile device 2 (or of an external device communicating with the mobile device 2) extracts features from the captured image, for example the features F11 to F14 representing the four corners of the window as rather prominent features of the window, and creates a feature descriptor for each of the features F11 to F14, as described in more detail below. The created local feature descriptor describes these features F11 to F14 in a different way as compared to the left column (standard approach as described above) making them clearly distinguishable, as illustrated by the extracted features F11 to F14 depicted in a normalized coordinate system in the right column. Particularly, aligning the feature orientation to a global orientation as defined by coordinate system 10 of the sensor 5 results in four well distinguishable descriptors without constraining the device orientation. Features taken under different camera orientations can be matched.

Figure 4:
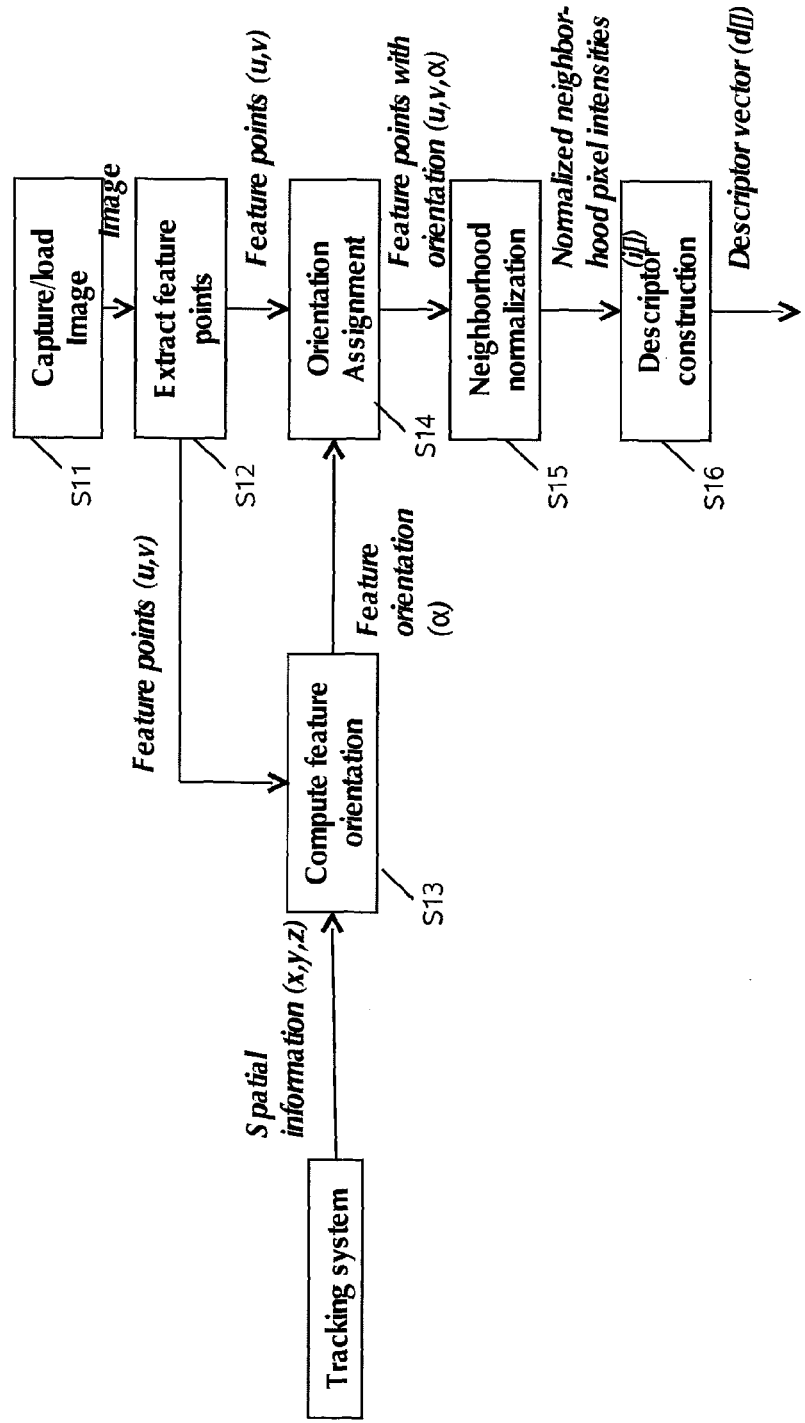
FIG. 4 shows in a flow diagram an embodiment of a method according to the invention for constructing a feature descriptor.

In FIG. 4, there is shown a flow diagram of an embodiment of a method according to the invention for constructing a feature descriptor. In step SI 1, an image is captured by a capturing device, e.g. the camera of the mobile device 2, or loaded from a storage medium. In step SI 2, feature points are extracted from the image to gain feature points in a 2-dimensional description (parameters u, v). In step S13 the feature orientation is computed for the extracted feature point using spatial information on the orientation of the capturing device (parameters x, y, z) provided by a tracking system.

For example, the tracking system gives the orientation of the capturing device with respect to a world coordinate system as Euler angles and feature descriptors are supposed to be aligned with the gravitational force. A very simple way to gain the orientation for all features is to transform the gravitational force to a coordinate system attached to the capturing device using the Euler angles first and then project it onto the image plane. Thereby, the direction of the gravitational force in the image is computed and used for all features in the image. This technique assumes orthogonal projection which is generally not the case. Incorporating the intrinsic parameters of the camera relaxes this assumption but still all techniques based on 2D images assume everything visible in the image to lie on a plane and therefore are approximations.

In step SI 4, an orientation assignment is performed to add to the parameters u, v an orientation angle a based on the feature orientation angle a determined in step SI 3. Thereafter, a neighborhood normalization step SI 5 is performed to gain normalized neighborhood pixel intensities i[ ]. In the final step SI 6, a feature descriptor in the form of a descriptor vector d[ ] is created for the respective extracted feature depending on a parameter which is indicative of an orientation of the extracted feature, particularly resulting from the orientation assignment in step SI 4.

According to another embodiment of the invention, as the capturing device a range data capturing device may be used, wherein pixels of images taken with any kind of range data capturing device, such as laser scanners, time-of-flight cameras, or stereo cameras may have associated 3D coordinates. In this case any orientation in a common coordinate system for a particular feature point can be computed from the 3D positions of the neighboring pixels of the feature point.

Given a feature at pixel P, for all neighborhood pixels Ni (where i is the index of the neighboring pixel), the 3D vector originating from P and pointing to Ni is computed. The two nearest neighbors to the desired orientation vector are determined and used to interpolate the desired orientation in image space.

Furthermore, the knowledge of the 3D position of at least two pixels allows for computing a rotation angle for in-plane rotation in the neighborhood normalization step. If the 3D world coordinates of three or more pixels are known, a three-dimensional transformation can be computed to warp the local neighborhood or the entire image to one or more reference orientations in the normalization step.

Feature descriptors extracted from images with associated spatial information of different kind from different tracking systems can be matched using the proposed technique.

FIG. 1 schematically compares the results of standard approaches against globally-aligned local feature descriptors determined according to the invention by the example of the four corners of a window, as shown and as described above. While the standard approach (features F1-F4 on the left) results in four identical descriptors, the global alignment in accordance with the invention leads to clearly distinctive feature descriptors (features F11-F14 on the right).

Therefore, according to aspects of the invention, when extracting local feature descriptors from images with associated information on the orientation of the capturing device with respect to a common coordinate system, it is proposed to assign the orientation of a feature based on this information. Particularly, the orientation for a feature is being aligned with a common coordinate system, projected to the image coordinate system. This enables higher distinctiveness between descriptors of congruent or near-congruent features with different orientations while allowing for free movement and rotation of the camera. The method according to the invention can be easily plugged into any existing local feature descriptor that relies on a normalized local neighborhood by taking into account the measured orientation, as shown in FIG. 4.

Optionally the measured device orientation does not only influence the feature orientation assignment in that it provides a single angle to rotate the camera image about in the neighborhood normalization step, but is also used to warp parts of or the entire image to one or more reference orientations to correct for perspective distortions in the particular feature neighborhoods in addition.

For example, the method as described above may be implemented in a process of stereo matching, particularly wide-baseline stereo matching, camera tracking, image retrieval, image classification, object classification or object recognition.

The goal of stereo matching is to reconstruct the 3D geometry of a scene or object given two images of it taken from different viewpoints. This is done by finding corresponding pixels in the two images depicting the same 3D point and computing their depths by means of triangulation.

Camera tracking describes the process of computing the pose (position and orientation) of a camera given one or more camera images. Features in the camera image are either matched against reference features with known 3D positions to compute an absolute pose or against features from the previous frame to compute the relative change in position and orientation.

Classification of images or objects assigns a given image or three-dimensional description of an object to one of n possible classes. An example would be a method that tells if a given image depicts apples or pears, even if the particular fruit in the query image has not been used for training or as a reference image. Whereas in image retrieval and object recognition for a given query the exactly matching reference image or object is searched for.

All these techniques rely on the matching of features of two or more images.

FIGS. 5A and 5B show in a schematic manner an exemplary first image and second image depicting the same object with respective extracted features which are to be matched. For example, the images may have been captured under different conditions or circumstances, such as different perspectives, light conditions, etc.

In the first image IMI, a real static object ROI as shown in FIG. 5A is captured by a camera (not shown). In the image IMI features of the real object ROI are extracted, such as shown in FIG. 5A by features F51. In a following step, descriptors may be computed for every extracted feature F51 in accordance with the method of the invention. These features F51 are then matched with features F52 extracted in the second image IM2. The second image IM2 is depicting a real object R02 which corresponds with real object ROI under a different viewpoint, wherein for the features F52 also a respective descriptor is determined. Particularly, if the descriptors of features F51 and F52 are relatively close in terms of a certain similarity measure, they are matched. For example, if every descriptor is written as a vector of numbers, when comparing two descriptors, one can use the Euclidian distance between two corresponding vectors as similarity measure.

There are three matches shown in FIG. 5 illustrated by connecting them with a dashed line. Match M51 is a correct one since the two features matched here correspond to the same physical entity, whereas matches M52 and M53 are wrong as they match features corresponding to different physical entities. In match M52 the two features have a similar (near-congruent) neighborhood in different orientations. While such mismatches are common using standard approaches, this invention aims to avoid them. The two features matched in M53 have a similar neighborhood in a similar orientation and can therefore lead to mismatches in both standard approaches and an embodiment of this invention.

The common way to compute the orientation of a feature based on pixel intensities of neighboring pixels has a high repeatability and is therefore a reliable characteristic of a feature. When aligning features with a common coordinate system as suggested in this invention, this characteristic can be used to add additional distinctiveness to the descriptors and increase matching performance. When extracting features, optionally one or more directions based on image intensities are computed and stored with respect to the common coordinate system for each feature. In the matching stage the number of comparisons needed can be reduced by comparing only features with similar directions with respect to the common coordinate system.

This detailed description has set forth some embodiments of the present invention. It is to be understood that the above description of a possible implementation is intended to be illustrative and not restrictive. Moreover, in this disclosure the terms "first", "second", etc., are used merely as labels, and are not intended to impose numerical requirements on their objects. Other embodiments and modifications within the scope of the claims will be apparent to those of skill in the art upon studying the above description in connection with the drawings.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method of providing a descriptor for at least one feature of an image, comprising:
   providing an image captured by a capturing device and extracting at least one feature from the image; and
   assigning a descriptor to the at least one feature, the descriptor depending on at least one parameter indicative of an orientation with respect to a direction of a gravitational force in 3D space,
   wherein the at least one parameter is determined from at least one tracking system, and
   wherein the at least one parameter is determined from depth information associated with the at least one feature.

2. The method of claim 1, further comprising determining at least one 3D position related to the at least one feature according to the depth information associated with the at least one feature and the at least one tracking system, wherein the at least one parameter is further determined from the at least one 3D position.

3. The method of claim 1, further comprising:
   providing at least one surrounding pixel of the at least one feature in the image and depth information associated with the at least one surrounding pixel;
   determining at least one 3D position related to the at least one surrounding pixel according to the depth information associated with the at least one surrounding pixel and the at least one tracking system,
   wherein the at least one parameter is further determined from the at least one 3D position associated with the at least one surrounding pixel.

4. The method of claim 1, wherein the orientation with respect to the direction of the gravitational force in 3D space is represented by a 3D vector originating from a respective 3D position, related to the at least one feature, in 3D space in a world coordinate system.

5. The method of claim 1, wherein the at least one parameter is determined from an orientation of the capturing device in reference to a common coordinate system.

6. The method of claim 1, wherein the tracking system comprises a sensor, in particular an inertial sensor, or an accelerometer, or a gyroscope or a compass, which is associated with the capturing device.

7. The method of claim 1, wherein the tracking system comprises a mechanical and/or electromagnetic and/or acoustic and/or optical tracking system.

8. The method of claim 1, wherein the capturing device comprises a range data capturing device, particularly a laser scanner, time-of-flight camera, or a stereo camera, which provides image pixels with an associated depth and/or 3D position.

9. The method of claim 1, further comprising the step of normalizing a neighborhood of the at least one feature with respect to the orientation.

10. The method of claim 9, wherein in the step of normalizing the neighborhood of the at least one feature, the orientation provides an angle for rotating the image.

11. The method of claim 9, wherein in the step of normalizing the neighborhood of the at least one feature, the orientation is used to warp the entire image or parts of the image to one or more reference orientations to correct for perspective distortions in particular feature neighborhoods.

12. The method of claim 11, wherein the at least one parameter is further determined according to depth information associated with the at least one feature and depth information associated with at least two other pixels in the image.

13. A method of matching features of two or more images, comprising:
   extracting at least one first feature of a first image and at least one second feature of a second image;
   providing a first descriptor for the first feature and a second descriptor for the second feature, wherein at least one of the first and second descriptors is provided according to the method of claim 1; and
   comparing the first and second descriptors in a matching process for the first and second features.

14. The method of claim 13, wherein in the matching process it is determined based on a similarity measure whether the first and second features correspond with each other.

15. The method of claim 14, wherein the similarity measure comprises a multi-stage method that successively computes different measures to reject wrong matches as early as possible.

16. The method of claim 1, wherein the method is implemented in a process of stereo matching, particularly wide-baseline stereo matching, camera tracking, image retrieval, object recognition, visual search, pose estimation, visual surveillance, scene reconstruction, motion estimation, panorama stitching, or image restoration.

17. A non-transitory computer readable medium comprising software code which, when executed by a processor, causes the processor to:
   provide an image captured by a capturing device and extract at least one feature from the image; and
   assign a descriptor to the at least one feature, the descriptor depending on at least one parameter indicative of an orientation with respect to a direction of a gravitational force in 3D space, wherein at least one parameter is determined from at least one tracking system, and wherein the at least one parameter is determined from depth information associated with the at least one feature.

18. The method of claim 13, wherein the method is implemented in a process of stereo matching, particularly wide-baseline stereo matching, camera tracking, image retrieval, object recognition, visual search, pose estimation, visual surveillance, scene reconstruction, motion estimation, panorama stitching or image restoration.

19. The computer readable medium of claim 17, wherein the software code further causes the process to determine at least one 3D position related to the at least one feature according to the depth information associated with the at least one feature and the at least see tracking system, wherein the at least one parameter is further determined from the at least one 3D position.

20. A system for providing a descriptor for at least one feature of an image, comprising:

a processor; and a memory coupled to the processor and comprising computer code which, when executed by the processor, causes the processor to:

provide an image captured by a capturing device and extract at least one feature from the image; and assign a descriptor to the at least one feature, the descriptor depending on at least one parameter indicative of an orientation with respect to a direction of a gravitational force in 3D space, wherein the at least one parameter is determined from at least one tracking system, and wherein the at least one parameter is determined from depth information associated with the at least one feature.

* * * * *

UNITED STATES PATENT AND TRADEMARK OFFICE
CERTIFICATE OF CORRECTION

PATENT NO. : 10,062,169 B2
APPLICATION NO. : 14/567668
DATED : August 28, 2018
INVENTOR(S) : Daniel Kurz et al.

It is certified that error appears in the above-identified patent and that said Letters Patent is hereby corrected as shown below:

In the Claims

Claim number 17, at Column 11, Line number 1 should read -- wherein the at least one parameter is determined from at least -- and

Claim number 19, at Column 11, Line number 13 should read -- the software code further causes the processor to determine at --

Signed and Sealed this
Second Day of October, 2018

Andrei Iancu
*Director of the United States Patent and Trademark Office*